(No Model.)
J. S. ROAKE.
FILTER.
No. 446,153. Patented Feb. 10, 1891.
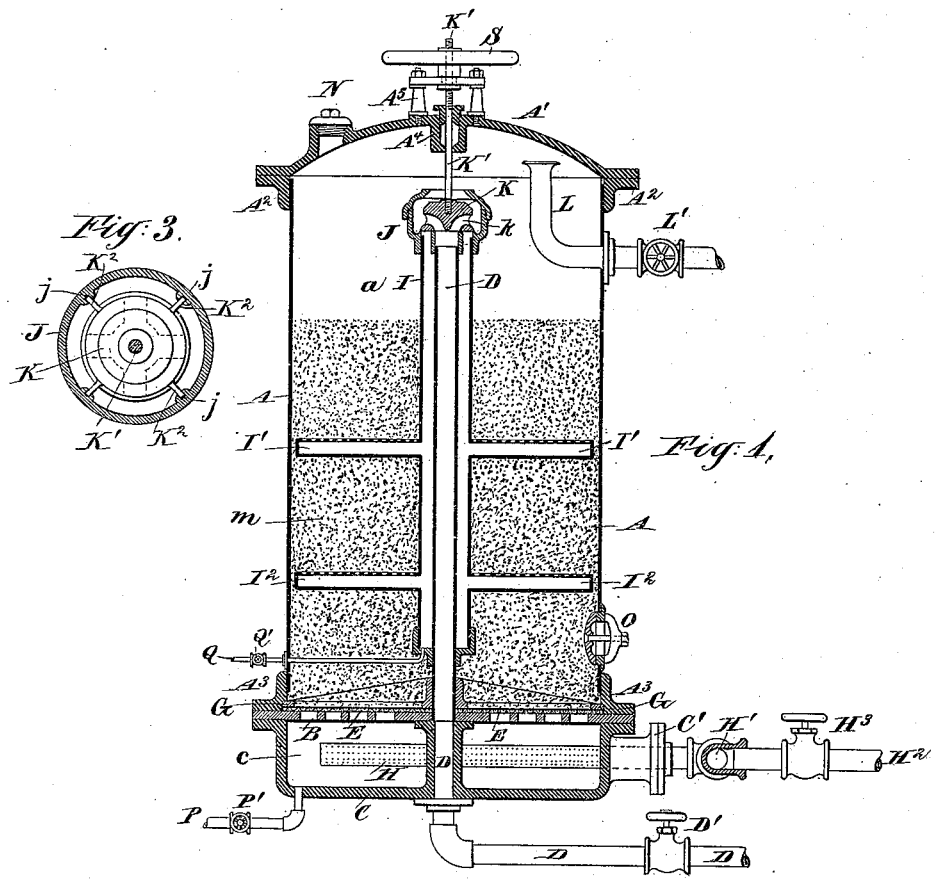
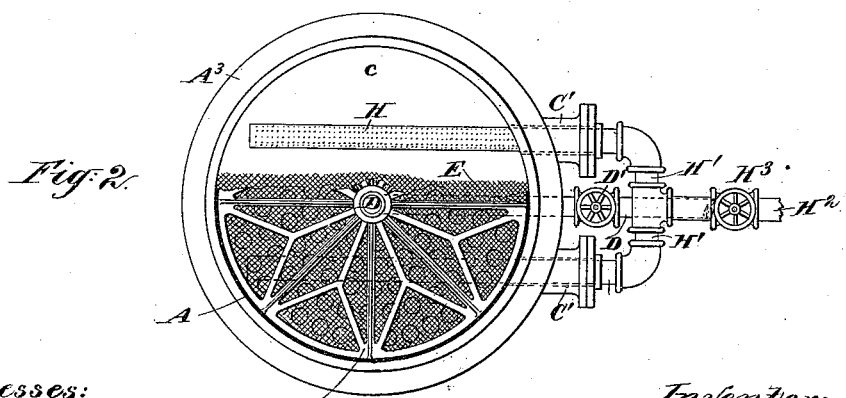
Witnesses:
Charles R. Searle
H. A. Johnstone
Inventor:
John S. Roake
by his attorney
Thomas Drew Stetson

UNITED STATES PATENT OFFICE.

JOHN S. ROAKE, OF BROOKLYN, NEW YORK.

FILTER.

SPECIFICATION forming part of Letters Patent No. 446,153, dated February 10, 1891.

Application filed May 24, 1888. Serial No. 274,886. (No model.)

*To all whom it may concern:*

Be it known that I, JOHN S. ROAKE, of Brooklyn, in the county of Kings and State of New York, doing business in New York city, have invented a certain new and useful Improvement in Filters, of which the following is a specification.

I will describe the material of my filter as sand mingled with finely-broken coke. The proportions may be varied and the materials may be varied; but it is important that the filtering material be composed of loose particles of such specific gravity as to sink into a relatively compact mass when the water is quiet, and yet so conditioned that they will be separated and agitated by an upward flow of water through the interstices. I have devised means by which the conditions can be readily adjusted to filter almost continuously and very successfully, delivering the water liberally for a long period, and then by a change of position of the valves the water is shut off from descending, and is introduced at the bottom and allowed to rise first through the upper strata of the filtering material and afterward through the entire mass or nearly the entire mass, bearing away the dirt and leaving the filtering material ready on a reversal of the parts to their first condition to serve again a long period as a filter. I provide for taking away the water from the delivery-chamber through perforated pipes, which avoid currents and allow any insoluble matter in the water to sink as a sediment in the bottom of the delivery-chamber, from which it may be removed at intervals.

The following is a description of what I consider the best means of carrying out the invention.

The accompanying drawings form a part of this specification.

Figure 1 is a central vertical section; and Fig. 2 is a horizontal section, partly in plan view. Certain portions are broken away to better show the parts below. Fig. 3 is a horizontal section of a portion on a larger scale.

Similar letters of reference indicate corresponding parts in all the figures where they occur.

A is an upright hollow cylinder of boiler-iron or other suitable material, which constitutes the main body of the casing. It has a close-fitting top $A'$. Flanges $A^2$ $A^3$, riveted at the ends, allow the bolting to a perforated plate B, extending across below and to an annular delivery-casing C at a still lower level.

I will designate the main chamber within the casing A as $a$ and the space within the casing C as the delivery-chamber $c$. The filtering material is marked $m$. It may be sand and coke, the latter being preferably comminuted to about the same size as the sand; but this may be varied. It is only essential that it be loose material of proper fineness which will sink in still water, and which may be loosened and slightly lifted by a sufficiently strong upward current of water. This filtering material fills the main chamber $a$ to a height somewhat above the middle.

D is an induction-pipe controlled by a cock $D'$. It extends upward through the center of the delivery-chamber $c$ and nearly to the top of the main chamber $a$. The water admitted through this pipe D fills the whole interior of the main chamber, inducing a slow descending current through the interstices between the mass of the filtering material $m$, from whence it escapes through a wire-gauze or analogous fine perforated strainer E, which lies on the perforated plate B and is held down by a spider G.

H H are two parallel perforated pipes extending inward through nozzles $C'$, formed in the casing C. The inner end of each pipe is closed. The outer end connects by a cross-pipe $H'$ with a single pipe $H^2$, controlled by a valve $H^3$. The pipes H are so perforated and are held at such height above the bottom of the chamber $c$ that the mass of water in the chamber $c$ is practically quiescent. The gentle current flowing downward through the uniformly-distributed apertures in the plate B allows its solid matter to settle in the bottom of the chamber $c$, while the pure water enters the perforations in H and is delivered through the system H $H'$ $H^2$.

I is a large pipe standing upright in the main chamber $a$, and concentrically inclosing the induction-pipe D. It is provided with two tiers of perforated branches $I'$ $I^2$, which extend out nearly to the main casing A. A small casing J at the upper end connects tightly and strongly to the upper end of both pipes D and I. This casing may be made in two or more pieces to facilitate the joining of the parts and the introduction and removal of a valve K, which is provided with passages k, and is finished at the top and bottom to make tight contacts with proper seats. Its stem K' extends out through a stuffing-box A⁴ in the cover A' and receives on its screw-threaded upper end a correspondingly internally-threaded hand-wheel or hand-nut S. The latter is mounted in a framing A⁵, stiffly held at a proper height above the stuffing-box, so that by turning the hand-wheel in one direction or the other the valve K can be forcibly depressed into tight contact with the seat below in the base of J, or forcibly raised into tight contact with the seat in the top of J. The valve K is also provided with four radial wings K², which engage in vertical grooves j in the interior of the casing J. They guide the valve K and prevent it from revolving as the hand-wheel S is turned in one direction or the other to raise and lower it. When this valve K is depressed, the water entering through the pipe D flows freely upward and outward through the passages k in the valve K, and emerges through the liberal opening in the top of J to fill the upper portion of the filter and compel the water to descend through the entire mass of sand to effect its escape through the discharge-pipes H and their connections. When this valve K is lifted, the discharge through the top of J is stopped, and the water received through D descends through the annular space between D and I and, entering the branches I' I², is discharged through the perforations therein. When the valve D' is opened but little and only a little water is thus inducted, it will all be discharged through the upper tier of perforated pipes I', and will flow upward through the interstices in the upper portion of the sand. Its current is gentle, but sufficient to separate the particles of the filtering material and wash away any solid matter which can be thus detached. After this operation has proceeded for a time and the upper strata of filtering material m is tolerably well cleaned the valve D' should be opened wider. The stronger current thus inducted will find insufficient escape through the perforations in the upper tier of pipes I', and will commence to escape, also, through the perforations in the lower tier I². The flow from the latter will loosen all the filtering material above the lower tier and will wash nearly the whole mass of filtering material in the filter. The water thus inducted, bearing the solid foreign matter which has accumulated in the filtering material during the previous period of service as a filter, will circulate in the upper portion of the filter-case and flow out through the pipe L, which is provided for this purpose, the cock L' being opened when the washing is commenced, and closed when the device is to be again used as a filter.

It will be understood that the cock H³ is, on the contrary, to be kept closed while the washing proceeds, and to be opened when the device is again to be used as a filter.

N is a removable bonnet in the top A'. A bonnet O covers a hand-hole in the main casing A.

P is a pipe controlled by a cock P' and connecting to the bottom of the chamber c.

Q is a pipe communicating with the space between the pipes D and I. It leads out through the casing A and is controlled by a cock Q'. These pipes and cocks allow of draining the apparatus whenever it is to be put out of use.

Modifications may be made without departing from the principle or sacrificing the advantages of the invention. There may be more than two tiers of the perforated branches or pipes I' I². The spider G, which holds down the strainer E, may be varied in form indefinitely.

When it is necessary at long intervals to wash the extreme bottom of the filtering material m, I can do so by reversing the current from the bottom by cocks and connections P P', or by letting the water flow backward from the perforated pipes H and upward through the strainer E, and thence upward through the entire mass of filtering material m. The water in such case will flow away from the top through the pipe L in the same manner as before.

I claim as my invention—

1. In a filter having the casing A, pipe D, inducting the water into the upper portion, and pipe H², discharging the water from below a strainer near the bottom, in combination with each other and with the perforated pipes I' I², immersed in the filtering material and connecting pipe I for supplying water thereto, and provision, as the cock D', for admitting water through the perforations to rise through the loose filtering material, and with the discharge-passage L and controlling means L', delivering water from the upper portion of the casing, arranged to serve in washing the filtering material by an upward current through the mass at intervals, substantially as herein specified.

2. In a water-filter, the single chamber-case A and filtering material therein, in combination with the stationary wash-pipe I, arranged centrally within the case and having two or more perforated tiers of branch pipes I' I² the pipe D, arranged concentrically within the pipe I for inducting the water into the upper portion of the case, and the eduction-pipe L, leading from the top of the case and arranged to produce an upward current first in the upper portion and afterward in the main body of the filtering material m, substantially as herein specified.

3. In a filter, the valve K and its operating means S, in combination with the casing J, having seats both above and below, and with the pipes D and I, arranged to serve substantially as herein specified.

4. In a filter, the filtering-chamber, the delivery-chamber c, separated therefrom by a perforated diaphragm, and a perforated strainer supported thereon, combined with the central pipe D and the surrounding pipe I, having perforated lateral branches I' and I², and the
5 perforated pipe H, arranged within the delivery-chamber, elevated above the bottom thereof and adapted to withdraw the water without inducing an appreciable current, as herein specified.

In testimony whereof I have hereunto set 10 my hand, at New York city, this 27th day of April, 1888, in the presence of two subscribing witnesses.

JOHN S. ROAKE.

Witnesses:
H. A. JOHNSTONE,
M. F. BOYLE.